(12) United States Patent
Kato (10) Patent No.: US 12,280,648 B2
(45) Date of Patent: Apr. 22, 2025

(54) POWER STORAGE UNIT AND VEHICLE

(71) Applicant: TOYOTA JIDOSHA KABUSHIKI KAISHA, Toyota (JP)

(72) Inventor: Masashi Kato, Konan (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 418 days.

(21) Appl. No.: 17/707,301

(22) Filed: Mar. 29, 2022

(65) Prior Publication Data
US 2022/0314778 A1 Oct. 6, 2022

(30) Foreign Application Priority Data
Mar. 31, 2021 (JP) .................. 2021-060813

(51) Int. Cl.
*B60K 1/04* (2019.01)
*H01M 50/209* (2021.01)

(52) U.S. Cl.
CPC ............. *B60K 1/04* (2013.01); *H01M 50/209* (2021.01); *B60K 2001/0433* (2013.01)

(58) Field of Classification Search
CPC ............. B60K 1/04; B60K 2001/0433; B60K 2001/0405; B60L 50/64; B60L 50/60; B60L 50/66; B60L 50/50; B60L 58/26; B60L 58/24; B60L 58/10; B60L 2240/545; B60L 2240/54; H01M 50/209; H01M 50/249; H01M 50/51; H01M 50/204; H01M 50/244; H01M 50/298; H01M 50/211; H01M 50/502; H01M 50/00; H01M 50/207; H01M 50/20; H01M 50/202
See application file for complete search history.

(56) References Cited

U.S. PATENT DOCUMENTS

| | | | | |
|---|---|---|---|---|
| 6,569,556 B2* | 5/2003 | Zhou | ................. | H01M 10/6565 429/88 |
| 8,647,764 B2* | 2/2014 | Naito | ................. | H01M 50/213 429/153 |
| 9,583,800 B2* | 2/2017 | Hwang | ................. | B60L 50/66 |
| 10,434,894 B2* | 10/2019 | Li | ................. | B60L 58/20 |
| 10,553,845 B2* | 2/2020 | Nagasato | ................. | H01M 50/289 |
| 10,680,216 B2* | 6/2020 | Miyamoto | ................. | B60L 50/64 |
| 10,930,907 B2* | 2/2021 | Muratsu | ................. | H01M 50/152 |
| 11,117,625 B2* | 9/2021 | Favaretto | ................. | B62D 21/02 |
| 11,161,402 B2* | 11/2021 | McCarron | ................. | B60G 7/02 |
| 11,251,494 B2* | 2/2022 | Weicker | ................. | B60K 1/04 |
| 11,318,995 B2* | 5/2022 | Charbonneau | ................. | B62D 27/02 |

(Continued)

FOREIGN PATENT DOCUMENTS

JP 2010-244760 A 10/2010

*Primary Examiner* — James M Dolak
(74) *Attorney, Agent, or Firm* — Sughrue Mion, PLLC (57) ABSTRACT

A power storage unit includes power storages each including a long side portion and a short side portion, each of the power storage being in a longitudinal shape. The power storages include first power storages arranged on one side in a first direction, second power storages arranged on the other side in the first direction, and at least one third power storage arranged between the first power storages and the second power storages. The first power storages and the second power storages are arranged as being aligned in a second direction in horizontal arrangement, and the at least one third power storage is arranged in longitudinal arrangement.

8 Claims, 6 Drawing Sheets

(56) References Cited

U.S. PATENT DOCUMENTS

| | | | |
|---|---|---|---|
| 12,080,903 B2* | 9/2024 | Kotik | H01M 50/209 |
| 12,095,105 B2* | 9/2024 | Hur | H01M 50/271 |
| 12,103,376 B2* | 10/2024 | Satou | B60K 1/04 |
| 12,107,247 B2* | 10/2024 | Botadra | H01M 50/291 |
| 12,119,502 B2* | 10/2024 | Chen | H01M 50/103 |
| 12,142,793 B2* | 11/2024 | Song | H01M 10/482 |
| 12,148,903 B2* | 11/2024 | Schmitz | H01M 10/6568 |
| 12,148,907 B2* | 11/2024 | Jin | H01M 10/653 |
| 12,151,547 B2* | 11/2024 | Langworthy | H01M 50/204 |
| 12,155,077 B2* | 11/2024 | Kumar | H01M 10/425 |
| 12,157,518 B2* | 12/2024 | Kecalevic | B62D 25/2036 |
| 12,159,989 B2* | 12/2024 | Norimine | H01M 50/209 |
| 12,160,019 B2* | 12/2024 | Taniuchi | H01M 50/209 |
| 2012/0034507 A1* | 2/2012 | Harada | B60L 58/26 |
| | | | 429/120 |
| 2016/0164054 A1* | 6/2016 | Yamamoto | H01M 50/516 |
| | | | 429/61 |
| 2019/0210470 A1 | 7/2019 | Thomas et al. | |
| 2019/0225093 A1 | 7/2019 | Li et al. | |
| 2021/0091352 A1 | 3/2021 | Weicker et al. | |

* cited by examiner

POWER STORAGE UNIT AND VEHICLE

This nonprovisional application is based on Japanese Patent Application No. 2021-060813 filed with the Japan Patent Office on Mar. 31, 2021, the entire contents of which are hereby incorporated by reference.

BACKGROUND

Field

The present disclosure relates to a power storage unit mounted on a vehicle and a vehicle on which the power storage unit is mounted.

Description of the Background Art

Japanese Patent Laying-Open No. 2010-244760 discloses as a conventional power storage unit, a technique to arrange power storages in longitudinal arrangement and horizontal arrangement as being mixed, each of the power storages having a ratio of a length between a long side and a short side of 2:1.

SUMMARY

In the power storage unit described in Japanese Patent Laying-Open No. 2010-244760, however, in a mount state, the power storages may be arranged in longitudinal arrangement on at least one side in a width direction of a vehicle. In an example in which the power storage unit thus includes power storages arranged in longitudinal arrangement on one side in the width direction, when a vehicle is hit broadside, insufficient durability of the power storage unit against side impact is a concern.

In Japanese Patent Laying-Open No. 2010-244760, when power storages aligned in a row direction are arranged in parallel to a front/rear direction of the vehicle, the power storages are arranged in horizontal arrangement on opposing sides in the width direction of the vehicle. In such arrangement, however, the power storages are arranged in horizontal arrangement in the entire width direction of the vehicle, and the power storages may not be arranged appropriately in correspondence with a vehicle width of a desired size.

The present disclosure was made in view of problems as above, and an object of the present disclosure is to provide a power storage unit that can be arranged in correspondence with a desired vehicle width in a mount state in which the power storage unit is mounted on a vehicle and can achieve improved durability against side impact applied to a vehicle, and a vehicle including the power storage unit.

A power storage unit based on the present disclosure includes power storages each including a pair of long side portions and a pair of short side portions in a plan view, each power storage being in a rectangular shape. The power storages include first power storages arranged on one side in a first direction in parallel to a width direction of a vehicle in a mount state in which the power storage unit is mounted on the vehicle, second power storages arranged on the other side in the first direction, and at least one third power storage arranged between the first power storages and the second power storages in the first direction. The first power storages and the second power storages are arranged in horizontal arrangement as being aligned in a second direction in parallel to a front/rear direction of the vehicle such that the short side portions are in parallel to the second direction and the long side portions are in parallel to the first direction in the mount state. The at least one third power storage is arranged in longitudinal arrangement such that the short side portions are in parallel to the first direction and the long side portions are in parallel to the second direction.

In the construction, the first power storages and the second power storages located on opposing sides in the first direction are arranged in horizontal arrangement as being aligned in the second direction such that the short side portions are in parallel to the second direction and the long side portions are in parallel to the first direction.

Therefore, when shock is applied by side impact, the long side portions arranged as being aligned in the second direction function as support wall portions.

When the first power storages and the second power storages are arranged in longitudinal arrangement as being aligned in the second direction, on the other hand, the short side portions arranged as being aligned in the second direction function as the support wall portions.

Therefore, when the first power storages and the second power storages are arranged in horizontal arrangement as being aligned in the second direction, the number of support wall portions can be larger than in an example in which they are arranged in longitudinal arrangement as being aligned in the second direction. Shock applied by side impact can thus be distributed to the support wall portions, and shock applied per one support wall portion can be lessened. Consequently, shock resistance of the power storage unit against side impact can be improved.

By arranging at least one third power storage in accordance with a vehicle width of a desired size, power storages can appropriately be arranged in correspondence with the vehicle width of the desired size.

In the power storage unit based on the present disclosure, n (n being an integer equal to or larger than two) first power storages and n second power storages may be arranged as being aligned in the second direction. In this case, of the long side portions included in the at least one third power storage, the long side portion located closest to the first power storages is preferably opposed to n short side portions aligned in the second direction on the other side in the first direction, of pairs of the short side portions included in the first power storages. Of the long side portions included in the at least one third power storage, the long side portion located closest to the second power storages is preferably opposed to n short side portions aligned in the second direction on the one side in the first direction, of pairs of the short side portions included in the second power storages.

In the construction, a space where the power storages are placed can effectively be made use of while shock resistance of the power storage unit against side impact is improved.

In the power storage unit based on the present disclosure, a ratio of a length between the short side portion and the long side portion may be set to 1:n (n being an integer equal to or larger than two).

In the construction, the power storages can further efficiently be arranged and a space where the power storages are placed can be made smaller.

In the power storage unit based on the present disclosure, basic units each including the first power storages, the second power storages, and the at least one third power storage may be arranged as being aligned in the second direction.

In the construction, since basic units are arranged as being aligned in the second direction, a capacity of the power storage unit can be increased while durability against side impact is improved.

In the power storage unit based on the present disclosure, each of the power storages includes a positive electrode external terminal portion and a negative electrode external terminal portion. In this case, the first power storages and the second power storages may be identical in pattern of arrangement of the positive electrode external terminal portion and the negative electrode external terminal portion. The at least one third power storage may be different in pattern of arrangement of the positive electrode external terminal portion and the negative electrode external terminal portion from the first power storages and the second power storages.

In the construction, the power storages can be connected in series while types of power storages different in pattern of arrangement are fewer.

The power storage unit is mounted on a vehicle based on the present disclosure.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

An embodiment of the present disclosure will be described in detail below with reference to the drawings. The same elements or elements in common in the embodiment shown below have the same reference characters allotted in the drawings and description thereof will not be repeated.

First Embodiment

Figure 1:
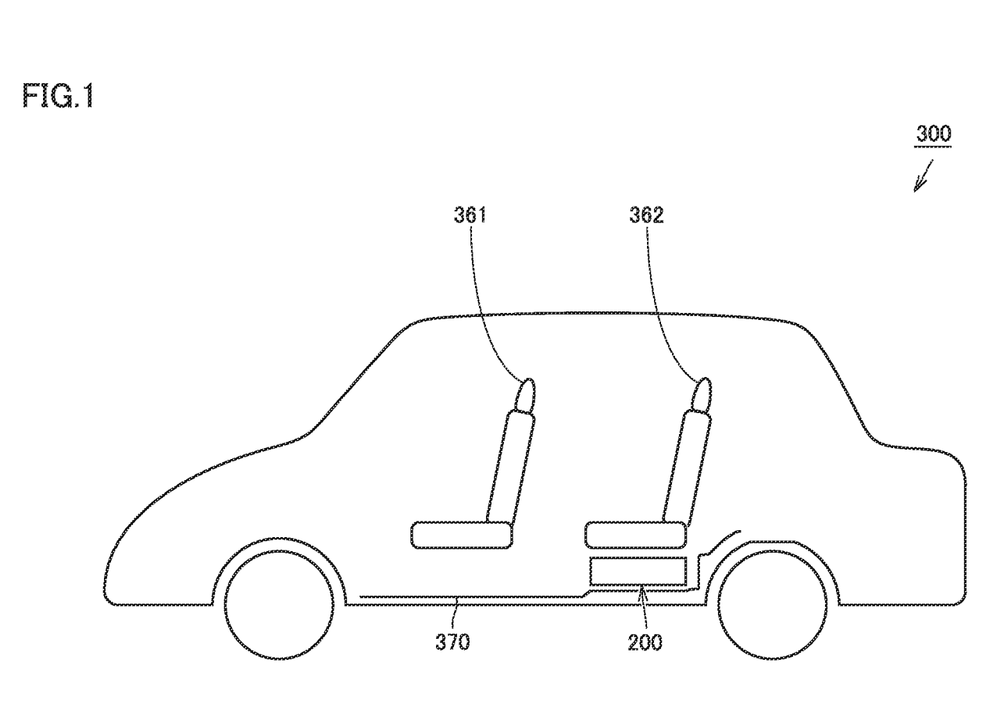
FIG. 1 is a diagram schematically showing a vehicle on which a power storage unit according to a first embodiment is mounted.

FIG. 1 is a diagram schematically showing a vehicle on which a power storage unit according to a first embodiment is mounted. A vehicle 300 on which a power storage unit 200 according to the first embodiment is mounted will be described with reference to FIG. 1.

Vehicle 300 is a hybrid vehicle that can travel with motive power from at least one of a motor and an engine or an electrically powered vehicle that travels with driving force obtained from electric energy.

Vehicle 300 includes a front seat 361, a rear seat 362, a floor panel 370, and power storage unit 200.

Floor panel 370 forms a bottom of a main body of vehicle 300. Front seat 361 and rear seat 362 are arranged in a compartment of vehicle 300. Front seat 361 and rear seat 362 are arranged at a distance in a front/rear direction of the vehicle. Front seat 361 and rear seat 362 are arranged above floor panel 370.

Power storage unit 200 is mounted on floor panel 370. Power storage unit 200 is arranged below rear seat 362 and more specifically between rear seat 362 and floor panel 370.

Power storage unit 200 supplies electric power to a motor for driving the vehicle. Electric power generated by the motor by regenerative braking or the like is stored in power storage unit 200. Power storage unit 200 includes power storages 100 (see FIG. 2).

Figure 2:
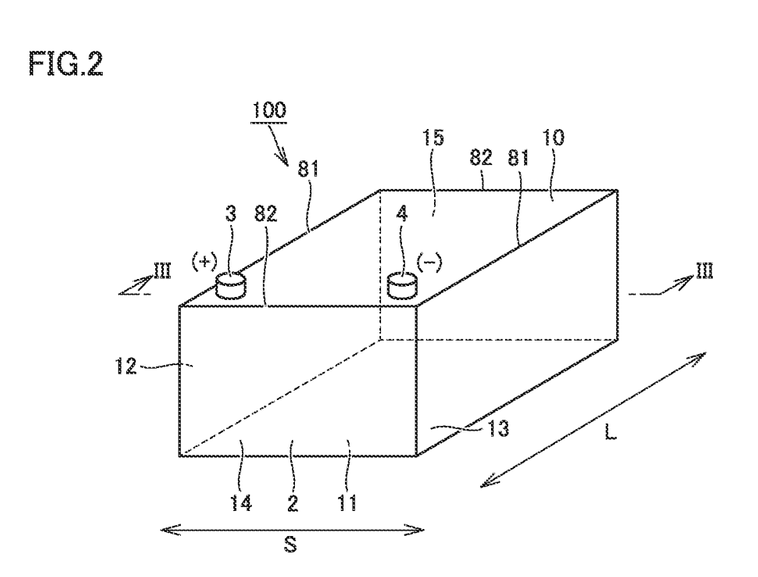
FIG. 2 is a perspective view schematically showing a power storage provided in the power storage unit according to the first embodiment.
Figure 3:
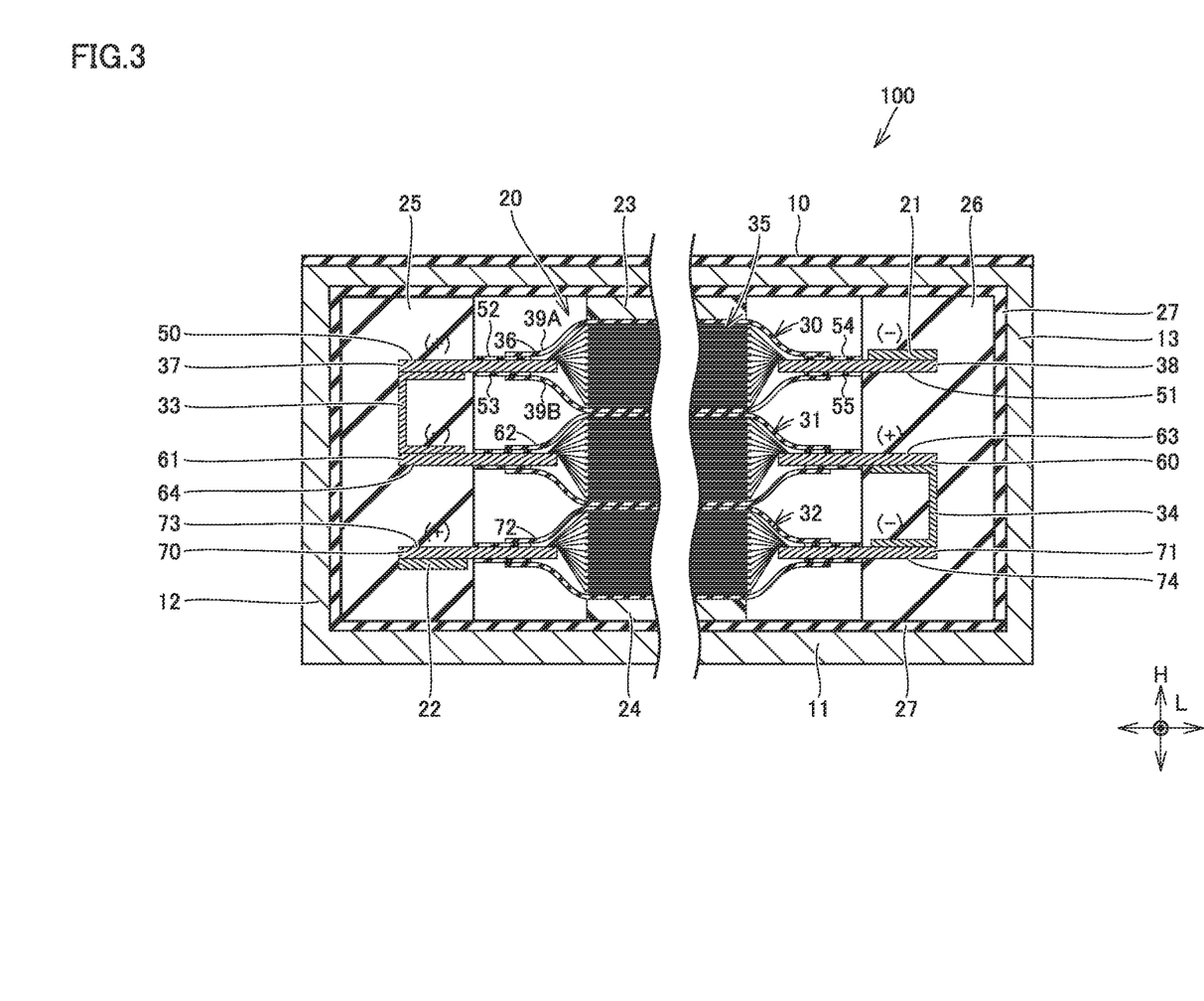
FIG. 3 is a cross-sectional view along the line III-III shown in FIG. 2.
Figure 4:
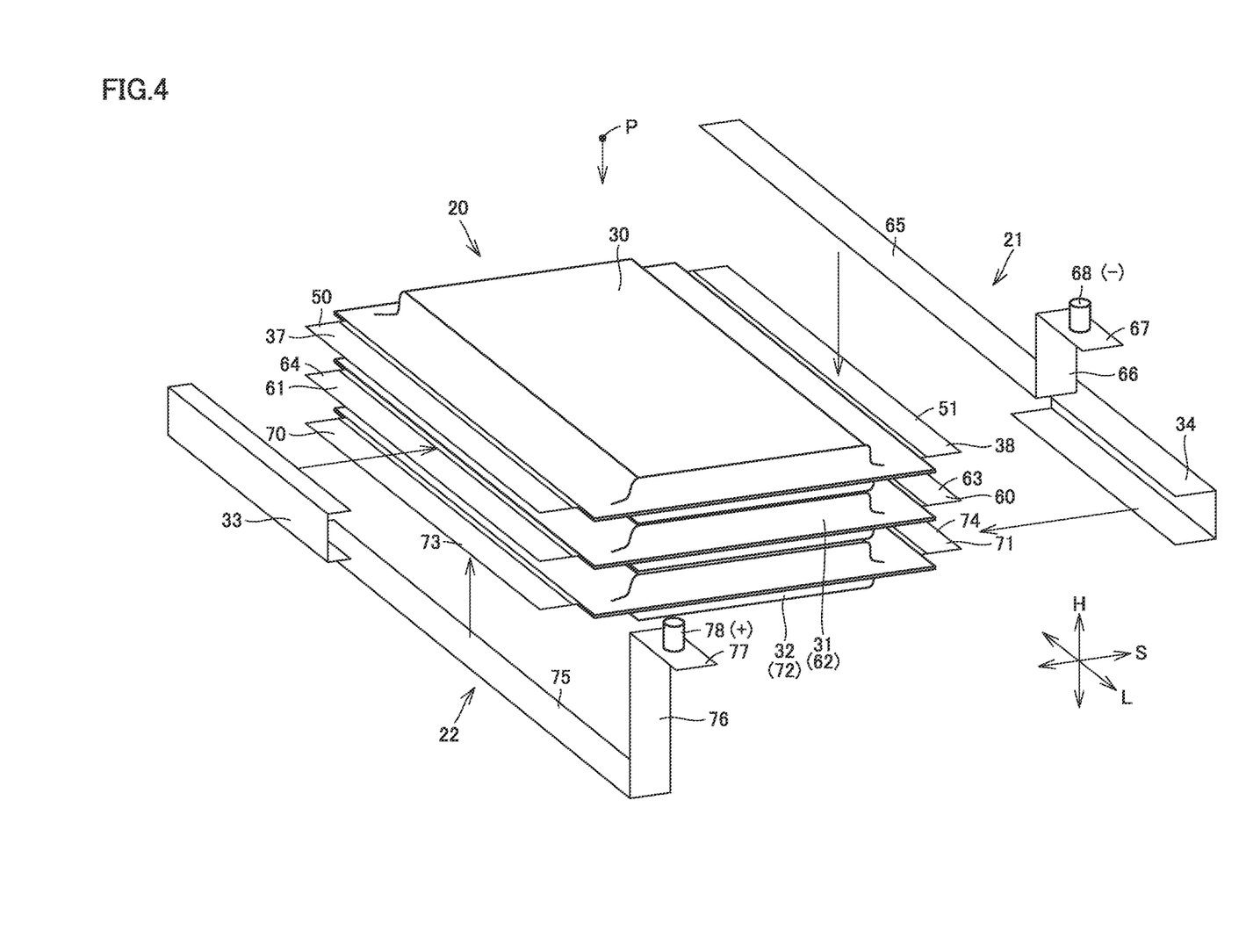
FIG. 4 is a perspective view schematically showing a power storage module, a conductive member, and the like provided in the power storage according to the first embodiment.

FIG. 2 is a perspective view schematically showing the power storage provided in the power storage unit according to the first embodiment. FIG. 3 is a cross-sectional view along the line III-III shown in FIG. 2. FIG. 4 is a perspective view schematically showing a power storage module, a conductive member, and the like provided in the power storage according to the first embodiment. Power storage 100 will be described with reference to FIGS. 2 to 4.

As shown in FIG. 2, power storage 100 is substantially in a shape of a parallelepiped, and in a plan view, it is in a substantially rectangular shape including a longitudinal direction L and a short-side direction S. Power storage 100 includes a pair of long side portions 81 and a pair of short side portions 82 in the plan view. Power storage 100 includes a casing 2, a positive electrode external terminal portion 3, and a negative electrode external terminal portion 4.

Casing 2 is formed substantially in a shape of a parallelepiped. Casing 2 includes a top plate 10, a bottom plate 11, sidewalls 12 and 13, and end walls 14 and 15. Sidewall 12 and sidewall 13 are disposed in short-side direction S and sidewall 12 and sidewall 13 are formed to extend in longitudinal direction L. End wall 14 and end wall 15 are disposed in longitudinal direction L and end wall 14 and end wall 15 are formed to extend in short-side direction S.

Positive electrode external terminal portion 3 and negative electrode external terminal portion 4 are provided on an upper surface of top plate 10. Positive electrode external terminal portion 3 and negative electrode external terminal portion 4 are arranged at a distance in short-side direction S.

As shown in FIG. 3, power storage 100 includes a power storage module 20, conductive members 21 and 22 connected to power storage module 20, expansion accommodation materials 23 and 24, insulating members 25 and 26, and an insulating film 27.

Power storage module 20 includes power storage cells 30, 31, and 32 stacked in a direction of stack H and connection members 33 and 34. The number of power storage cells included in power storage module 20 is not limited to three, and the number of power storage cells can be changed as appropriate to two or more or four or more.

Since power storage cells 31 and 32 are constructed substantially similarly to power storage cell 30, description of power storage cell 30 will be given.

As shown in FIGS. 2 and 3, power storage cell 30 includes an electrode assembly 35, a housing 36, a positive electrode current collection plate 37, and a negative electrode current collection plate 38.

Housing 36 is formed from an aluminum laminate film or the like. Electrode assembly 35 and a not-shown electrolyte solution are accommodated in housing 36.

Housing 36 includes an upper film 39A and a lower film 39B. Upper film 39A is arranged to cover electrode assembly 35 from above and lower film 39B is provided to cover electrode assembly 35 from below.

An outer peripheral portion of upper film 39A and an outer peripheral portion of lower film 39B are bonded to each other by a not-shown adhesive.

Electrode assembly 35 is formed into a shape of a parallelepiped. Electrode assembly 35 includes positive electrode sheets, separators, and negative electrode sheets stacked in direction of stack H. The separator is arranged between the positive electrode sheet and the negative electrode sheet.

The positive electrode sheet includes an aluminum foil and a positive electrode composite material layer formed on each of front and rear surfaces of the aluminum foil. The negative electrode sheet includes a copper foil and a negative electrode composite material layer formed on each of front and rear surfaces of the copper foil.

The aluminum foil that forms the positive electrode sheet is drawn to one side surface of electrode assembly 35 and the copper foil that forms the negative electrode sheet is drawn to the other side surface of electrode assembly 35. One side surface and the other side surface are disposed in short-side direction S and formed to extend in longitudinal direction L.

Positive electrode current collection plate 37 is formed of aluminum or the like. Positive electrode current collection plate 37 is arranged on one side surface (one side in short-side direction S). Aluminum foils that form the positive electrode sheet are welded to positive electrode current collection plate 37.

An adhesive 52 is formed on an upper surface of positive electrode current collection plate 37 and bonds upper film 39A and positive electrode current collection plate 37 with each other. An adhesive 53 is formed on a lower surface of positive electrode current collection plate 37 and bonds lower film 39B and positive electrode current collection plate 37 with each other. Adhesives 52 and 53 extend to the outside of housing 36 in short-side direction S.

Positive electrode current collection plate 37 protrudes outward relative to housing 36 and adhesives 52 and 53 on one side in short-side direction S. Positive electrode current collection plate 37 includes an exposed portion 50 exposed through housing 36 and adhesives 52 and 53.

Negative electrode current collection plate 38 is formed of copper or the like. Negative electrode current collection plate 38 is arranged on the other side surface (the other side in short-side direction S). Copper foils that form the negative electrode sheet are welded to negative electrode current collection plate 38.

An adhesive 54 is formed on an upper surface of negative electrode current collection plate 38 and bonds negative electrode current collection plate 38 and upper film 39A with each other. An adhesive 55 is formed on a lower surface of negative electrode current collection plate 38 and bonds negative electrode current collection plate 38 and lower film 39B with each other. Adhesives 54 and 55 extend to the outside of housing 36 in short-side direction S.

Negative electrode current collection plate 38 protrudes outward relative to housing 36 and adhesives 54 and 55 in short-side direction S and includes an exposed portion 51 exposed through housing 36 and adhesives 54 and 55.

As shown in FIG. 3, power storage cell 31 includes a positive electrode current collection plate 60, a negative electrode current collection plate 61, and a housing 62, and an electrode assembly and an electrolyte solution are accommodated in housing 62. Positive electrode current collection plate 60 includes an exposed portion 63 similarly to positive electrode current collection plate 37. Negative electrode current collection plate 61 includes an exposed portion 64 similarly to negative electrode current collection plate 38.

Power storage cell 32 includes a positive electrode current collection plate 70, a negative electrode current collection plate 71, and a housing 72, and an electrode assembly and an electrolyte solution are accommodated in housing 72. Positive electrode current collection plate 70 includes an exposed portion 73 similarly to positive electrode current collection plate 37. Negative electrode current collection plate 71 includes an exposed portion 74 similarly to negative electrode current collection plate 38.

Positive electrode current collection plate 37, negative electrode current collection plate 61, and positive electrode current collection plate 70 are disposed in direction of stack H. Similarly, negative electrode current collection plate 38, positive electrode current collection plate 60, and negative electrode current collection plate 71 are disposed in direction of stack H. In other words, power storage cells 30, 31, and 32 are stacked such that the positive electrode current collection plate and the negative electrode current collection plate are alternately aligned in direction of stack H.

Connection member 33 is arranged to connect exposed portion 50 of positive electrode current collection plate 37 and exposed portion 64 of negative electrode current collection plate 61 to each other. Connection member 34 is provided to connect exposed portion 63 of positive electrode current collection plate 60 and exposed portion 74 of negative electrode current collection plate 71 to each other.

Conductive member 21 is welded to an upper surface of exposed portion 51 of negative electrode current collection plate 38. Conductive member 22 is welded to a lower surface of exposed portion 73 of positive electrode current collection plate 70.

As shown in FIG. 4, conductive member 21 includes a connection plate 65, a vertical wall 66, a base 67, and a protrusion 68. Connection plate 65 is welded to the upper surface of exposed portion 51. Connection plate 65 is formed to extend in longitudinal direction L and protrudes toward end wall 14 relative to power storage module 20. Connection plate 65 is arranged from one end to the other end of negative electrode current collection plate 38 in longitudinal direction L.

Vertical wall 66 is connected to an end of connection plate 65 located on a side of end wall 14. Vertical wall 66 is formed to extend upward from the end of connection plate 65.

Base 67 is formed at an upper end of vertical wall 66 and protrusion 68 is formed to protrude from base 67. Protrusion 68 has an upper end connected to negative electrode external terminal portion 4 shown in FIG. 1.

Conductive member 22 includes a connection plate 75, a vertical wall 76, a base 77, and a protrusion 78. Connection plate 75 is welded to a lower surface of exposed portion 73 of positive electrode current collection plate 70. Connection plate 75 is formed to extend in longitudinal direction L and protrudes toward end wall 14 relative to power storage module 20. Connection plate 75 is arranged from one end to the other end of positive electrode current collection plate 70 in longitudinal direction L.

Base 77 is formed at an upper end of vertical wall 76 and protrusion 78 is formed to protrude from base 77. Protrusion 78 has an upper end connected to positive electrode external terminal portion 3 shown in FIG. 1.

As shown in FIG. 3 again, expansion accommodation material 23 is arranged between an upper surface of power storage module 20 and top plate 10 of casing 2. Expansion accommodation material 24 is arranged between a lower surface of power storage module 20 and bottom plate 11 of casing 2. Expansion accommodation materials 23 and 24 each include a wrapping material and a dilatant material filled in the wrapping material.

Insulating member 25 is filled to reach power storage module 20 from sidewall 12. Exposed portion 50 of positive electrode current collection plate 37, exposed portion 64 of negative electrode current collection plate 61, connection member 33, and at least a part of conductive member 22 are located within insulating member 25.

Insulating member 26 is filled to reach power storage module 20 from sidewall 13. At least a part of conductive member 21, exposed portion 51 of negative electrode current collection plate 38, exposed portion 63 of positive electrode current collection plate 60, and exposed portion 74 of negative electrode current collection plate 71 are located within insulating member 26.

As power storage 100 constructed as above is charged or discharges, power storage module 20 deforms to expand in direction of stack H. At this time, expansion accommodation materials 23 and 24 deform to allow deformation of power storage module 20 as expanding. Thus, even when power storage module 20 deforms to expand, load applied to casing 2 through expansion accommodation materials 23 and 24 can be suppressed. Then, deformation of casing 2 can be suppressed.

When vehicle 300 travels, vibration may be applied to power storage 100. For example, power storage 100 may vibrate in such a manner that an anti-node of vibration is located at the center in longitudinal direction L of power storage 100.

At this time, a rate of displacement of a central portion of power storage 100 is higher than a rate of expansion of power storage module 20 in charging and discharging. Since expansion accommodation materials 23 and 24 include the dilatant material, rigidity against deformation at a high speed is high. Therefore, expansion accommodation materials 23 and 24 are less likely to deform and vibration of power storage 100 is suppressed.

In charging and discharging of power storage 100, a temperature of power storage module 20 increases. At this time, insulating member 25 is formed to cover exposed portions 50, 64, and 73, connection member 33, and at least a part of conductive member 22. Since exposed portions 50, 64, and 73, connection member 33, and conductive member 22 are formed of a metal material, heat in power storage module 20 is satisfactorily radiated to insulating member 25. Heat transmitted to insulating member 25 is radiated from sidewall 12.

Insulating member 26 is formed to cover at least a part of conductive member 21, exposed portions 51, 63, and 74, and connection member 34. Since conductive member 21, exposed portions 51, 63, and 74, and connection member 34 are formed of a metal material, heat in power storage module 20 is satisfactorily radiated to insulating member 26. Heat transmitted to insulating member 26 is radiated from sidewall 13. Power storage module 20 can thus satisfactorily be cooled.

As described above, in FIG. 4, connection plate 65 of conductive member 21 is connected to negative electrode current collection plate 38 and formed to extend in longitudinal direction L. In longitudinal direction L, connection plate 65 is formed from one end to the other end of negative electrode current collection plate 38.

Therefore, when negative electrode external terminal portion 4 is provided on the side of end wall 14 as in the present embodiment, connection to negative electrode external terminal portion 4 can easily be established by connecting vertical wall 66 or the like to the end of connection plate 65 on the side of end wall 14.

Similarly, connection plate 75 of conductive member 22 is formed to extend in longitudinal direction L. Then, in longitudinal direction L, connection plate 75 is arranged from one end to the other end of negative electrode current collection plate 38.

Therefore, when positive electrode external terminal portion 3 is provided on the side of end wall 14 as in the present embodiment, connection to positive electrode external terminal portion 3 can easily be established by connecting vertical wall 76 or the like to the end of connection plate 75 on the side of end wall 14.

Figure 5:
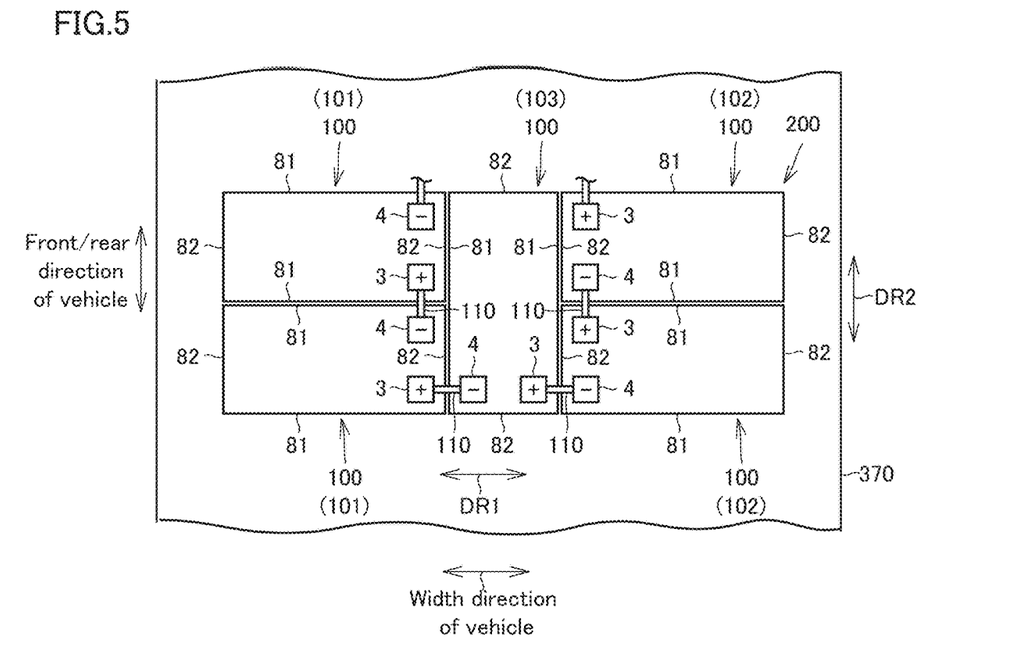
FIG. 5 is a top view of the power storage unit according to the first embodiment.

FIG. 5 is a top view of the power storage unit according to the first embodiment. Power storage unit 200 according to the first embodiment will be described with reference to FIG. 5.

Power storage unit 200 includes power storages 100 and bus bars 110. Power storages 100 include first power storages 101, second power storages 102, and a third power storage 103.

First power storages 101 are arranged on one side in a first direction DR1. First direction DR1 is in parallel to a width direction of a vehicle in a mount state in which power storage unit 200 is mounted on vehicle 300.

First power storages 101 are arranged as being aligned in a second direction DR2. Second direction DR2 is a direction orthogonal to first direction DR1 and in parallel to the front/rear direction of the vehicle in the mount state.

Each of first power storages 101 is arranged in horizontal arrangement such that short side portion 82 is in parallel to second direction DR2 and long side portion 81 is in parallel to first direction DR1. In the first embodiment, two first power storages 101 are arranged in horizontal arrangement as being aligned in second direction DR2.

Second power storages 102 are arranged on the other side in first direction DR1. Each of second power storages 102 is arranged in horizontal arrangement such that short side portion 82 is in parallel to second direction DR2 and long side portion 81 is in parallel to first direction DR1. In the first embodiment, two second power storages 102 as many as first power storages 101 are arranged in horizontal arrangement as being aligned in second direction DR2.

Third power storage 103 is arranged between first power storages 101 and second power storages 102 in first direction DR1. Third power storage 103 is arranged in longitudinal arrangement such that short side portion 82 is in parallel to first direction DR1 and long side portion 81 is in parallel to second direction DR2.

Of long side portions 81 included in third power storage 103, long side portion 81 located closest to first power storages 101 is opposed to two short side portions 82 aligned in second direction DR2 on the other side in first direction DR1, of pairs of short side portions 82 included in first power storages 101.

Of the long side portions included in third power storage 103, long side portion 81 located closest to second power storages 102 is opposed to two short side portions 82 aligned in second direction DR2 on one side in first direction DR1, of pairs of short side portions 82 included in second power storages 102.

By thus arranging third power storage 103, a space where power storages 100 are placed can effectively be made use of.

As described above, when two first power storages 101 and two second power storages 102 are arranged as being aligned in the second direction, a ratio of a length between short side portion 82 and long side portion 81 is set preferably to 1:2. By setting such a length ratio, power storages 100 can further efficiently be arranged and the space where power storages are placed can be made smaller.

An example in which the ratio of the length between the short side portion and the long side portion of a contour of casing 2 is set to 1:2 in the plan view of power storage 100 not including a cooling apparatus is illustrated in the above. Without being limited as such, when a cooling apparatus is provided as being in contact with sidewall 12 and/or sidewall 13, the ratio of the length between the short side portion and the long side portion in the contour including the cooling apparatus may be set to 1:2. In arranging power storages 100 as being aligned, a space large to some extent is provided in a gap between adjacent power storages 100 for air cooling or liquid cooling. Therefore, by adjusting this gap, the construction in the present disclosure is applicable also to an example in which the ratio of the length between the short side portion and the long side portion is not 1:2.

Each of bus bars 110 connects negative electrode external terminal portion 4 and positive electrode external terminal portion 3 in adjacent power storages 100 to each other. Power storages 100 are thus connected in series.

Second power storage 102 is the same as first power storage 101 arranged as being turned by 180 degrees, and first power storages 101 and second power storages 102 are identical in pattern of arrangement of positive electrode external terminal portion 3 and negative electrode external terminal portion 4.

Third power storage 103 is not in rotation symmetry to first power storage 101 and second power storage 102, and positions of positive electrode external terminal portion 3 and negative electrode external terminal portion 4 in third power storage 103 are opposite to positions of positive electrode external terminal portion 3 and negative electrode external terminal portion 4 in first power storage 101 and second power storage 102. In other words, third power storage 103 is different in pattern of arrangement of positive electrode external terminal portion 3 and negative electrode external terminal portion 4 from first power storage 101 and second power storage 102.

Specifically, in first power storage 101 and second power storage 102, when first power storage 101 and second power storage 102 are arranged such that positive electrode external terminal portion 3 and negative electrode external terminal portion 4 are located on the other side in first direction DR1, positive electrode external terminal portion 3 is arranged on one side in second direction DR2 and negative electrode external terminal portion 4 is arranged on the other side in second direction DR2.

In third power storage 103, on the other hand, when third power storage 103 is arranged such that positive electrode external terminal portion 3 and negative electrode external terminal portion 4 are located on the other side in first direction DR1, negative electrode external terminal portion 4 is arranged on one side in second direction DR2 and positive electrode external terminal portion 3 is arranged on the other side in second direction DR2.

By setting the pattern of arrangement of positive electrode external terminal portion 3 and negative electrode external terminal portion 4 in first power storage 101, second power storage 102, and third power storage 103 as above, power storages 100 can be connected in series while types of the power storages different in pattern of arrangement are fewer.

When vehicle 300 is hit broadside with power storage unit 200 being mounted on vehicle 300, shock is applied from the side of first power storages 101 or second power storages 102.

First power storages 101 and second power storages 102 are arranged in horizontal arrangement as being aligned in second direction DR2 such that short side portion 82 is in parallel to second direction DR2 and long side portion 81 is in parallel to first direction DR1 as described above.

Therefore, when shock is applied by side impact, long side portions 81 arranged as being aligned in second direction DR2 function as support wall portions.

When first power storages 101 and second power storages 102 are arranged as being aligned in second direction DR2 in longitudinal arrangement, short side portions 82 arranged as being aligned in second direction DR2 function as the support wall portions.

Therefore, when first power storages 101 and second power storages 102 are arranged as being aligned in second direction DR2 in horizontal arrangement, a larger number of support wall portions can be provided than in an example where first power storages 101 and second power storages 102 are arranged in longitudinal arrangement as being aligned in second direction DR2. Shock applied by side impact can thus be distributed to support wall portions, and shock applied per one support wall portion can be lessened. Consequently, shock resistance of power storage unit 200 against side impact can be improved.

In the present embodiment, a single third power storage 103 is provided, so that power storage unit 200 can suitably be mounted, for example, on a vehicle having a vehicle width approximately not larger than 1200 mm.

The number of third power storages 103 should only be set to at least one. Therefore, by changing as appropriate the number in accordance with the vehicle width, power storages can appropriately be arranged in correspondence with the vehicle width of a desired size.

Second Embodiment

Figure 6:
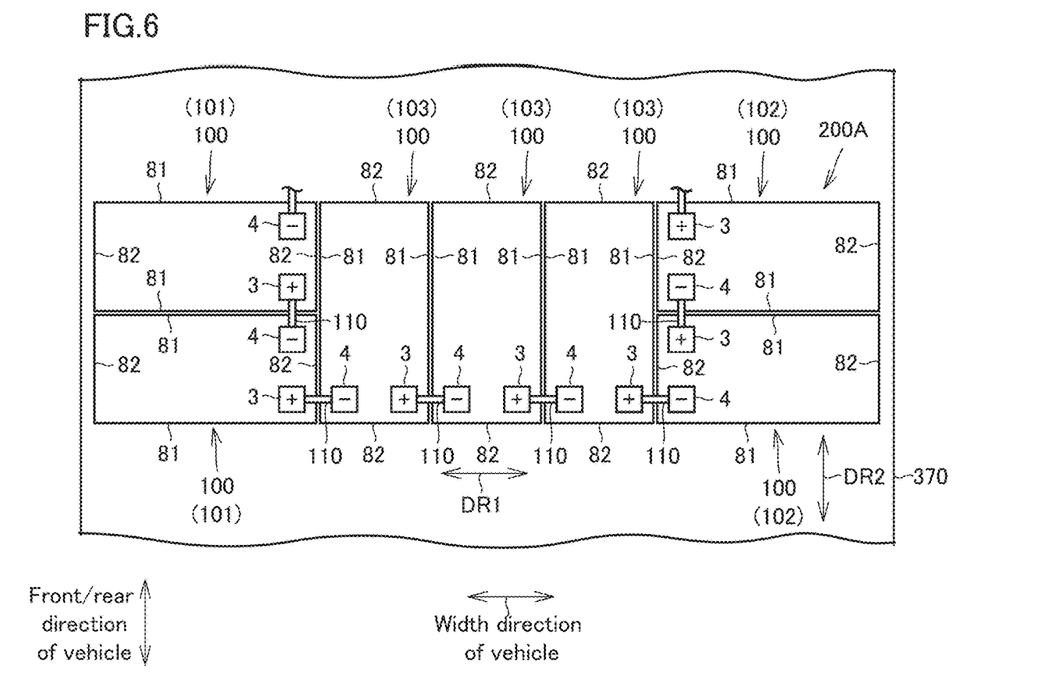
FIG. 6 is a top view of a power storage unit according to a second embodiment.

FIG. 6 is a top view of a power storage unit according to a second embodiment. A power storage unit 200A according to the second embodiment will be described with reference to FIG. 6.

As shown in FIG. 6, power storage unit 200A according to the second embodiment is different in number of third power storages 103 from power storage unit 200 according to the first embodiment. Specifically, three third power storages 103 are provided. The construction is otherwise substantially similar.

According to such a construction as well, power storage unit 200A according to the second embodiment achieves an effect substantially similar to the effect of power storage unit 200 according to the first embodiment. Power storage unit 200A according to the second embodiment can suitably be mounted on vehicle 300 larger in vehicle width than in the first embodiment. Specifically, power storage unit 200A can suitably be mounted, for example, on vehicle 300 having a vehicle width approximately not larger than 1700 mm.

Third Embodiment

Figure 7:
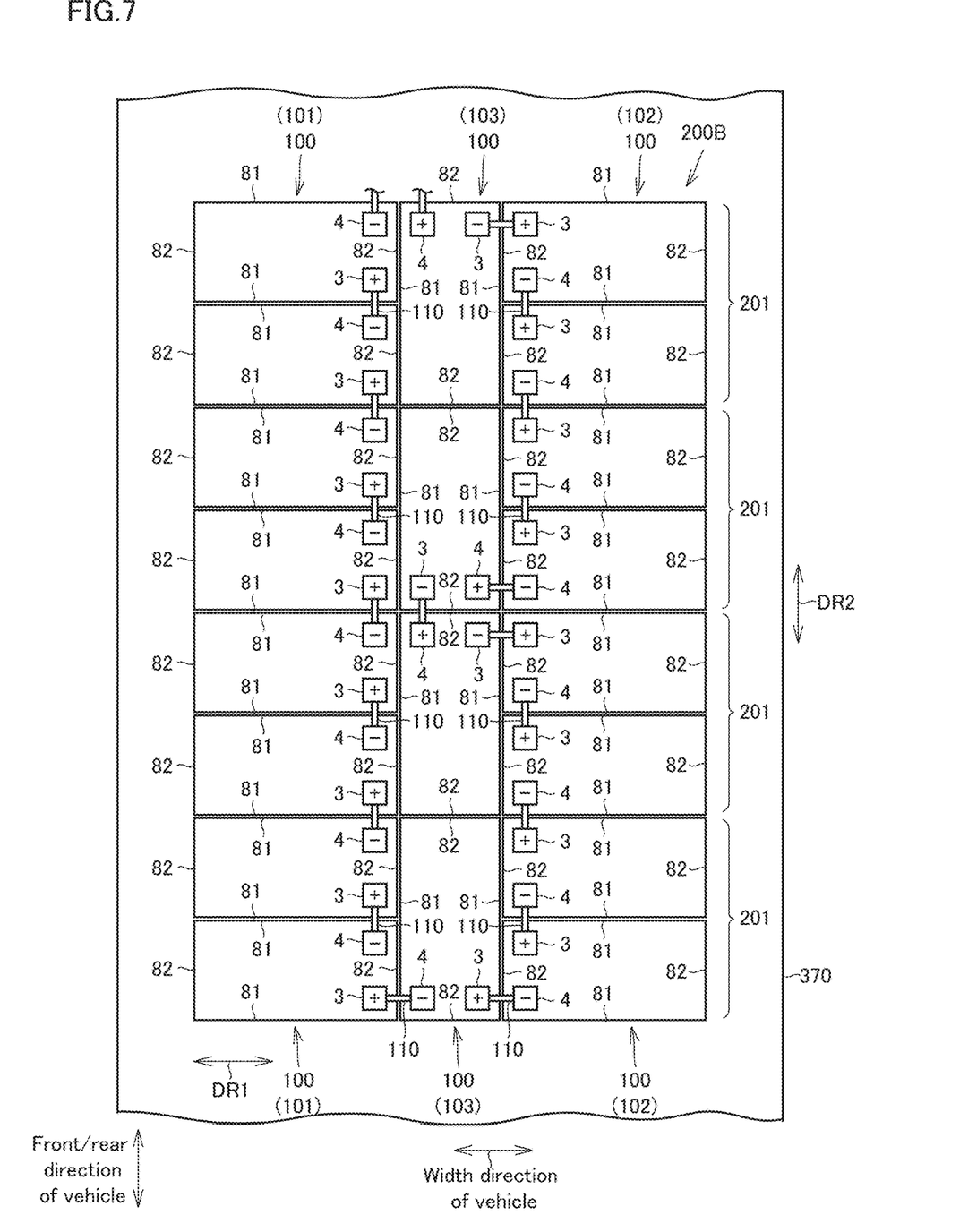
FIG. 7 is a top view of a power storage unit according to a third embodiment.

FIG. 7 is a top view of a power storage unit according to a third embodiment. A power storage unit 200B according to the third embodiment will be described with reference to FIG. 7.

As shown in FIG. 7, power storage unit 200B according to the third embodiment is different from power storage unit 200 according to the first embodiment in that sizes thereof in first direction DR1 and second direction DR2 are larger and power storage unit 200B is arranged below floor panel 370. The construction is otherwise substantially similar.

In this case, basic units 201 each composed of two first power storages 101, two second power storages 102, and one third power storage 103 shown in the first embodiment are arranged as being aligned in second direction DR2. Specifically, four basic units 201 are arranged as being aligned in second direction DR2.

In this case as well, as in the first embodiment, third power storage 103 is different in pattern of arrangement of positive electrode external terminal portion 3 and negative electrode external terminal portion 4 from first power storage 101 and second power storage 102.

According to such a construction as well, power storage unit 200B according to the third embodiment achieves an effect substantially similar to the effect of power storage unit 200 according to the first embodiment. Since basic units 201 are arranged as being aligned in second direction DR2, a capacity of power storage unit 200B can be increased while durability against side impact is improved.

An example in which two first power storages 101 and two second power storages 102 are arranged as being aligned in second direction DR2 in the first and second embodiments and in basic unit 201 in the third embodiment is illustrated and described. Without being limited as such, at least n (n being an integer equal to or larger than two) first power storages 101 and at least n second power storages 102 may be provided.

In this case, of long side portions 81 included in at least one third power storage 103, long side portion 81 located closest to first power storages 101 may be opposed to n short side portions 82 aligned in second direction DR2 on the other side in first direction DR1, of pairs of short side portions 82 included in first power storages 101, and of long side portions 81 included in at least one third power storage 103, long side portion 81 located closest to second power storages 102 may be opposed to n short side portions 82 aligned in second direction DR2 on one side in first direction DR1, of pairs of short side portions 82 included in second power storages 102.

The ratio of the length between short side portion 82 and long side portion 81 may be set to 1:n (n being an integer equal to or larger than two). Power storages 100 can thus efficiently be arranged.

Though an example in which a power storage cell included in power storage module 20 is a laminate-type battery in which an electrolyte solution and electrode assembly 35 are accommodated on an inner side of an exterior film is illustrated and described in the first to third embodiments above, a laminate-type solid-state battery in which an electrolyte solution is not accommodated on the inner side of the exterior film but a solid electrolyte is employed may be applicable.

Though embodiments of the present invention have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. A vehicle comprising:
a plurality of power storages devices each including a pair of long side portions and a pair of short side portions in a top view, each of the power storage devices being in a rectangular shape, and
a floor panel of the vehicle on which the power storage devices are mounted, wherein
the power storage devices include: a plurality of first power storage devices, a plurality of second power storage devices, and at least one third power storage device, wherein the at least one third power storage device is arranged between the first power storage devices and the second power storage devices in a first direction in parallel to a width direction of the vehicle, so that the first power storage devices are arranged on a first side of the at least one third power storage device, and the second power storages are arranged on a second side of the third power storage device, which is opposite from the first side of the at least one third power storage device,
the first power storage devices are arranged in a horizontal arrangement as being aligned in a second direction in parallel to a front/rear direction of the vehicle such that the short side portions of the first power storage devices are in parallel to the second direction and the long side portions of the first power storage devices are in parallel to the first direction,
the second power storage devices are arranged in a horizontal arrangement as being aligned in the second direction in parallel to the front/rear direction of the vehicle such that the short side portions of the second power storage devices are in parallel to the second direction and the long side portions of the second power storage devices are in parallel to the first direction, and
the at least one third power storage device is arranged longitudinally in the second direction such that the short side portions of the third power storage device are in parallel to the first direction and the long side portions of the third power storage device are in parallel to the second direction.

2. The vehicle according to claim 1, wherein
the first power storages include n first power storages, wherein n is an integer equal to or larger than two,
the second power storages include n second power storages,
the n first power storages are arranged adjacent to each other in the second direction,
the n second power storages are arranged adjacent to each other in the second direction,
the at least one third power storage is a single third power storage,
the pair of long side portions included in the single third power storage has a first long side portion located on one side of the single third power storage in the first direction and a second long side portion located on an opposite side of the single third power storage in the first direction,
the pair of short side portions of each of the n first power storages and the n second power storages has a first short side portion located on one side of each of the n first power storages and the n second power storages, in the first direction, and a second short side portion located on an opposite side of each of the n first power storages and the n second power storages in the first direction, the first long side portion of the single third power storage directly faces, in the first direction, each of the first short side portions of the n first power storages, and the second long side portion of the single third power storage directly faces, in the first direction, each of the first short side portions of the n second power storages.

3. The vehicle according to claim 2, wherein
a ratio of a length between the short side portions and the long side portions is 1: n (n being an integer equal to or larger than two).

4. The vehicle according to claim 1, wherein
each of the power storages includes a positive electrode external terminal portion and a negative electrode external terminal portion, the positive electrode external terminal portion and the negative electrode external terminal portion are disposed on a side of each of the first power storages and the second power storages where one of the pair of short side portions is located, and are aligned in the second direction, and the positive electrode external terminal portion and the negative electrode external terminal portion are disposed on a side of the at least one third power storage where one of the pair of short side portions is located, and are aligned in the first direction, and are aligned in the first direction with: one of the positive electrode external terminal portion and the negative electrode external terminal portion of the first power storages, and one of the positive electrode external terminal portion and the negative electrode external terminal portion of the second power storages.

5. A mounting structure of a plurality of power storage devices for a vehicle comprising:

the power storage devices each including a pair of long side portions and a pair of short side portions in a top view, each of the power storage devices being in a rectangular shape, and a floor panel of the vehicle on which the power storage devices are mounted, wherein the power storage devices include: a plurality of first power storage devices, a plurality of second power storage devices, and at least one third power storage device, wherein the at least one third power storage device is arranged between the first power storage devices and the second power storage devices in a first direction in parallel to a width direction of the vehicle, so that the first power storage devices are arranged on a first side of the at least one third power storage device, and the second power storage devices are arranged on a second side, which is opposite from the first side of the at least one third power storage device, the first power storage devices are arranged in a horizontal arrangement as being aligned in a second direction in parallel to a front/rear direction of the vehicle such that the short side portions of the first power storage devices are in parallel to the second direction and the long side portions of the first power storage devices are in parallel to the first direction, the second power storage devices are arranged in a horizontal arrangement as being aligned in the second direction in parallel to the front/rear direction of the vehicle such that the short side portions of the second power storage devices are in parallel to the second direction and the long side portions of the second power storage devices are in parallel to the first direction, and the at least one third power storage device is arranged longitudinally in the second direction such that the short side portions of the third power storage device are in parallel to the first direction and the long side portions of the third power storage device are in parallel to the second direction.

6. The mounting structure according to claim 5, wherein
the first power storages include n first power storages, wherein n is an integer equal to or larger than two, the second power storages include n second power storages, the n first power storages are arranged adjacent to each other in the second direction, the n second power storages are arranged adjacent to each other in the second direction, the at least one third power storage is a single third power storage, the pair of long side portions included in the single third power storage has a first long side portion located on one side of the single third power storage in the first direction and a second long side portion located on an opposite side of the single third power storage in the first direction, the pair of short side portions of each of the n first power storages and the n second power storages has a first short side portion located on one side of each of the n first power storages and the n second power storages, in the first direction, and a second short side portion located on an opposite side of each of the n first power storages and the n second power storages in the first direction, the first long side portion of the single third power storage directly faces, in the first direction, each of the first short side portions of the n first power storages, and the second long side portion of the single third power storage directly faces, in the first direction, each of the first short side portions of the n second power storages.

7. The mounting structure according to claim 6, wherein
a ratio of a length between the short side portions and the long side portions is 1:n (n being an integer equal to or larger than two).

8. The mounting structure according to claim 5, wherein
each of the power storages includes a positive electrode external terminal portion and a negative electrode external terminal portion, the positive electrode external terminal portion and the negative electrode external terminal portion are disposed on a side of each of the first power storages and the second power storages where one of the pair of short side portions is located, and are aligned in the second direction, and the positive electrode external terminal portion and the negative electrode external terminal portion are disposed on a side of the at least one third power storage where one of the pair of short side portions is located, and are aligned in the first direction, and are aligned in the first direction with: one of the positive electrode external terminal portion and the negative electrode external terminal portion of the first power storages, and one of the positive electrode external terminal portion and the negative electrode external terminal portion of the second power storages.

* * * * *